March 30, 1937.  E. F. WHEELER  2,075,247
FARE BOX
Filed July 16, 1932  9 Sheets-Sheet 2
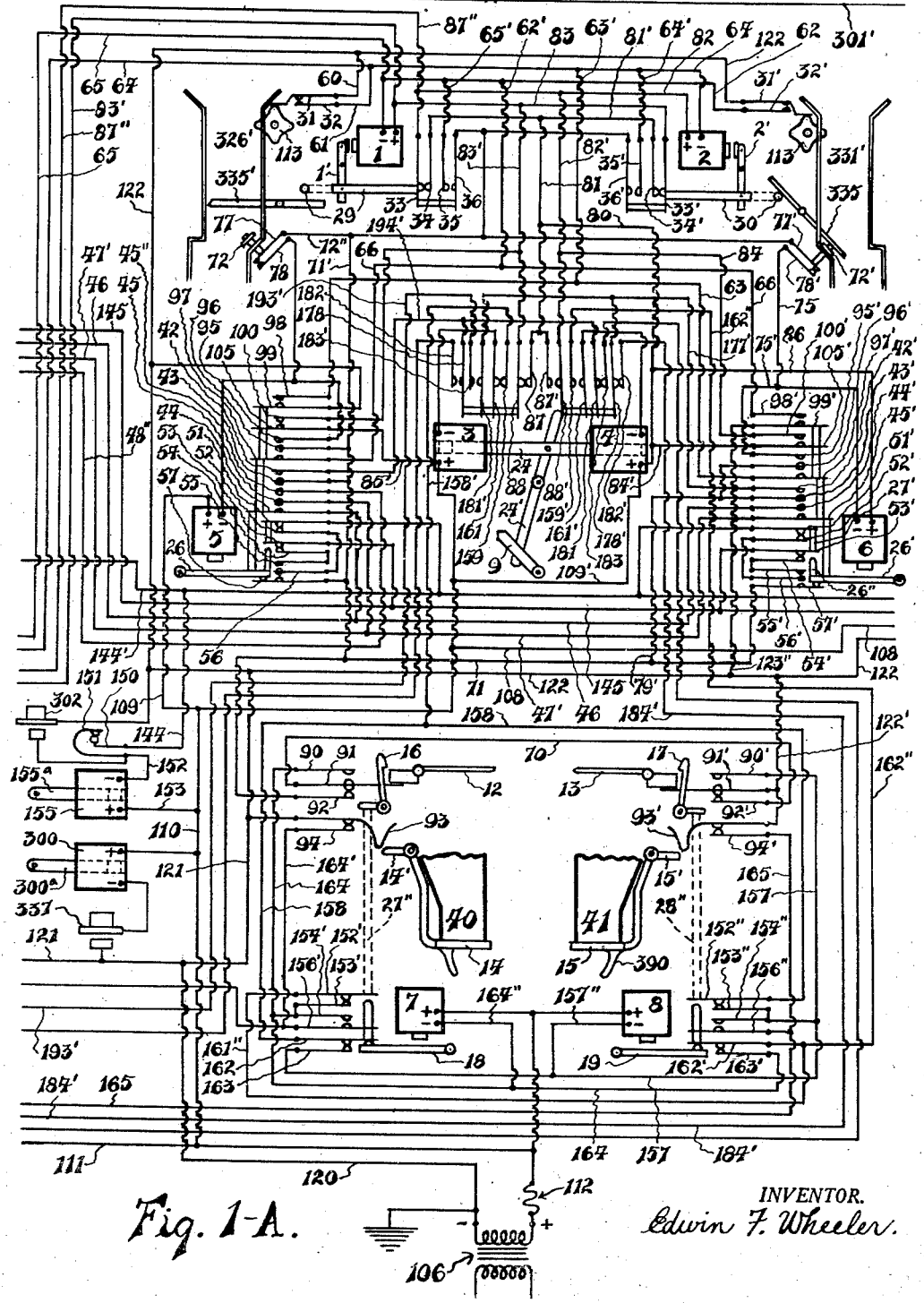
Fig. 1-A.
INVENTOR.
Edwin F. Wheeler.

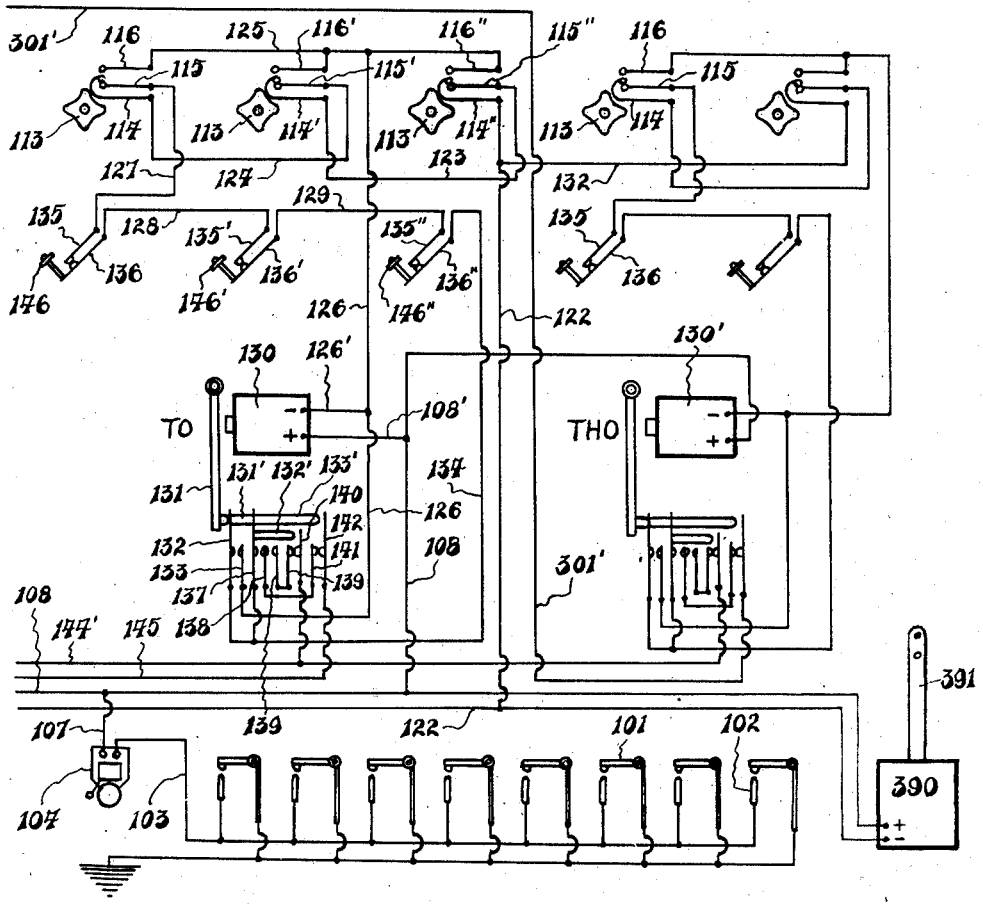
Fig. 1-B.

March 30, 1937.  E. F. WHEELER  2,075,247

FARE BOX

Filed July 16, 1932   9 Sheets-Sheet 4

Inventor
Edwin F. Wheeler

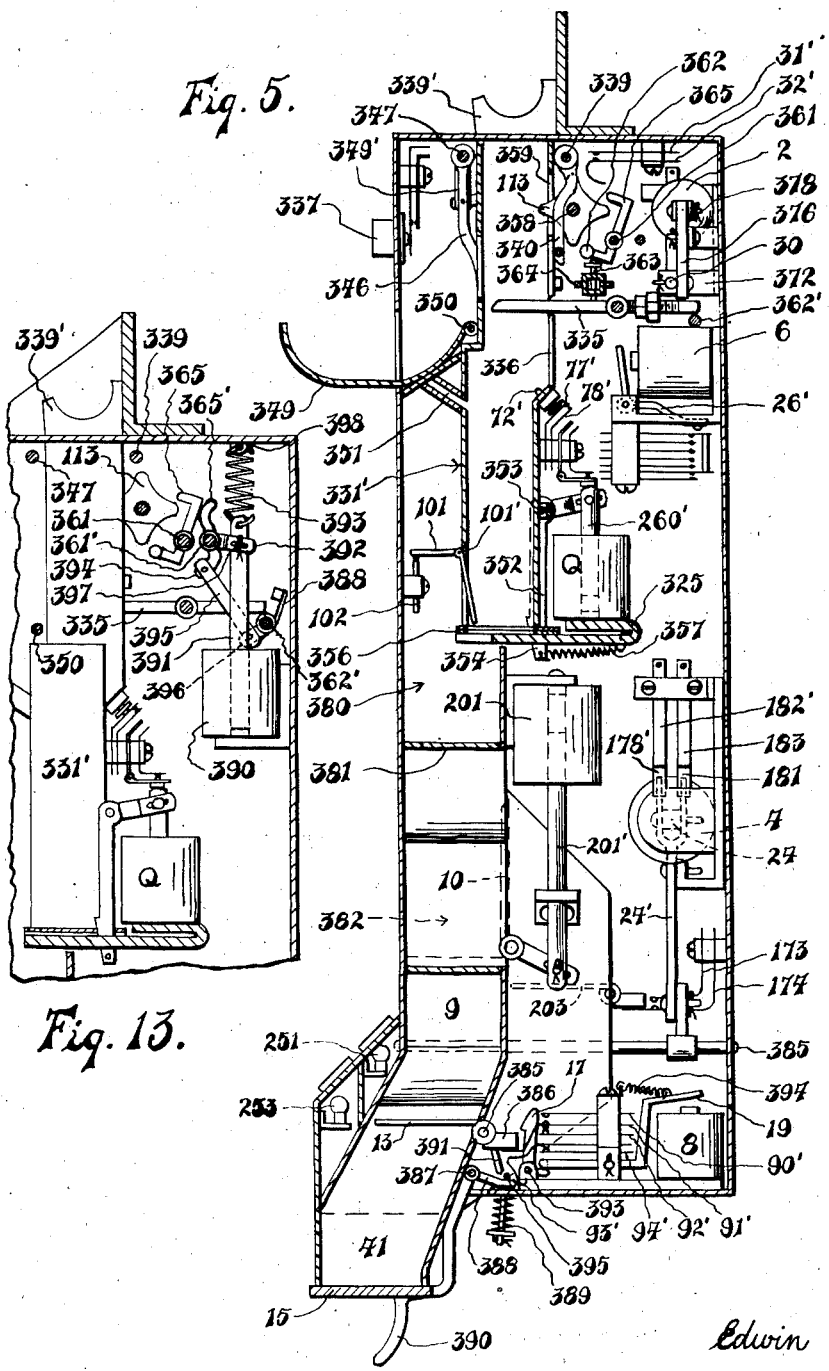

March 30, 1937.  E. F. WHEELER  2,075,247
FARE BOX
Filed July 16, 1932  9 Sheets-Sheet 6

Inventor
Edwin F. Wheeler

March 30, 1937.  E. F. WHEELER  2,075,247
FARE BOX
Filed July 16, 1932  9 Sheets-Sheet 8

Inventor
Edwin F. Wheeler.

March 30, 1937. E. F. WHEELER 2,075,247
FARE BOX
Filed July 16, 1932 9 Sheets-Sheet 9
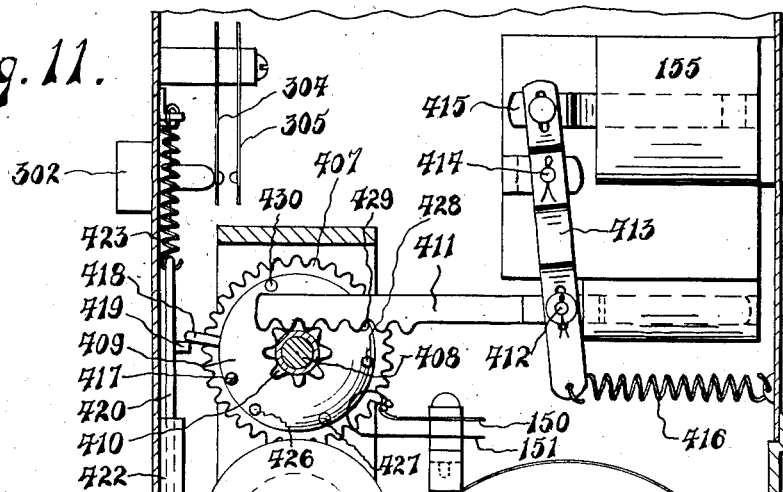
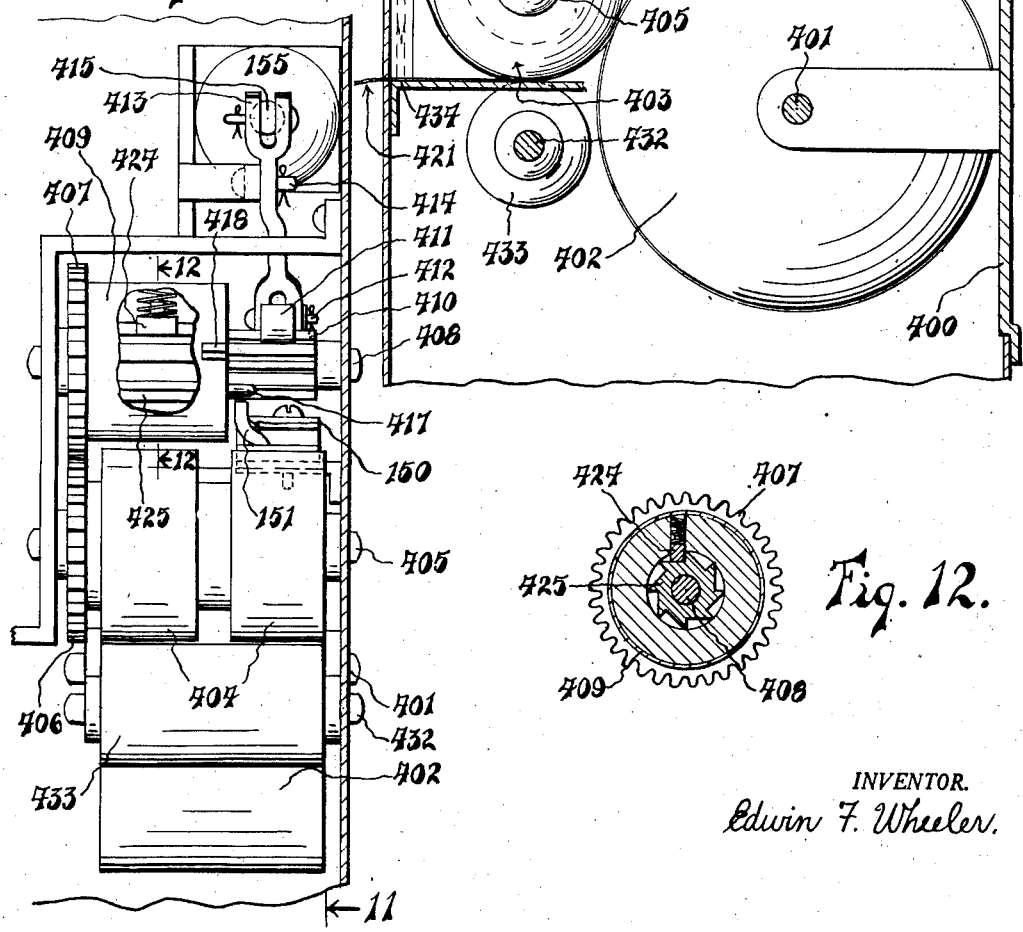
INVENTOR.
Edwin F. Wheeler.

Patented Mar. 30, 1937

2,075,247

UNITED STATES PATENT OFFICE 2,075,247

FARE BOX

Edwin F. Wheeler, Baltimore, Md., assignor of one-half to Charles C. Sanford, Hamilton, Baltimore, Md.

Application July 16, 1932, Serial No. 622,923

18 Claims. (Cl. 194—10)

This invention relates to a fare or admission box.

It is aimed to provide a generally improved construction for the deposit of whole fares and half fares in combination with suitable registers.

Another object is to provide a novel construction wherein change for a coin greater than the amount of the fare, will be given automatically upon the deposit of such coin.

A further object is to provide a novel construction utilizing a plurality of receptacles to be used alternately for the deposit of change therein by the conductor or other operator, so that the machine may operate prior to the removal of change from one of the locations.

Still another object is to provide a novel means whereby locking mechanism is associated with the change boxes controlled by the opening thereof.

In addition to the same to provide a novel means whereby change for only a single coin will be given at a time.

Various additional objects and advantages will become apparent from a consideration of the description following taken in connection with accompanying drawings illustrating an operative embodiment, and wherein Figures 1, 1—A and 1—B, considered jointly and from left to right in the order mentioned illustrate my improvement in electrical diagrams, Figure 2 is a front elevation of the apparatus, Figure 3 is a vertical sectional view taken on the line 3—3 of Figure 6, Figure 4 is an enlarged sectional detail illustrating the throw-out mechanism;

Figure 5 is a vertical sectional view taken on the line 5—5 of Figure 6;

Figure 7:
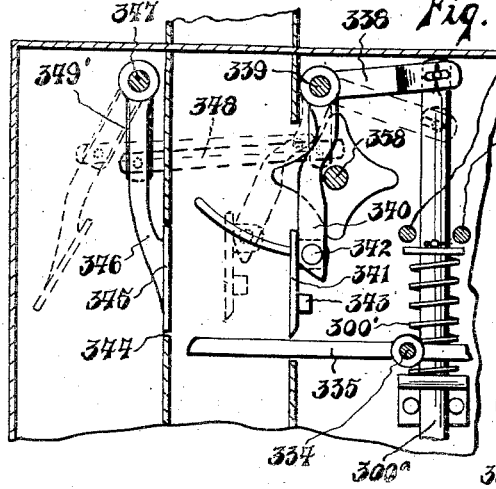
Figure 6:
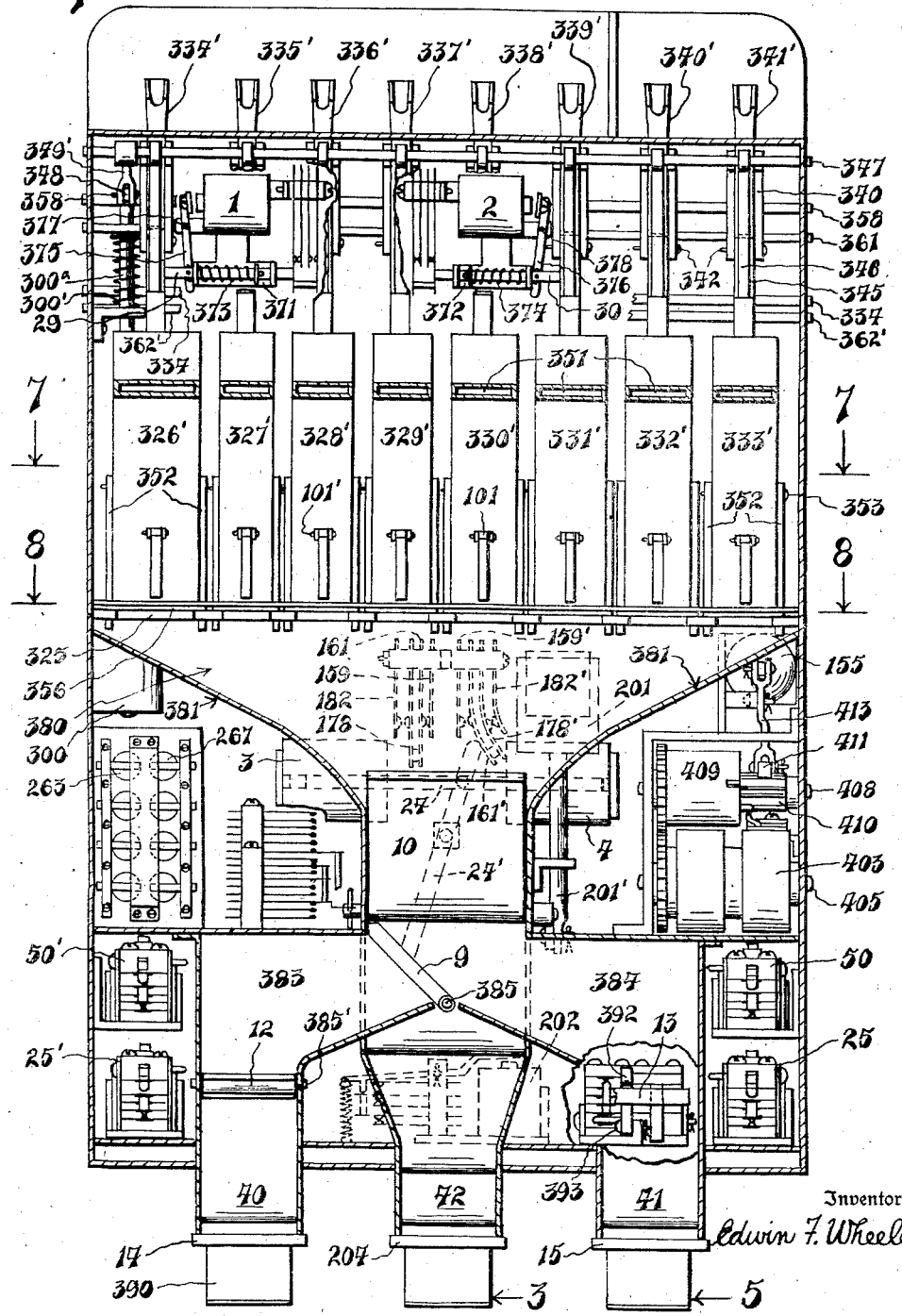
Figure 6 is an enlarged view of the apparatus looking from the front and with the cover plate removed.
Figure 7:
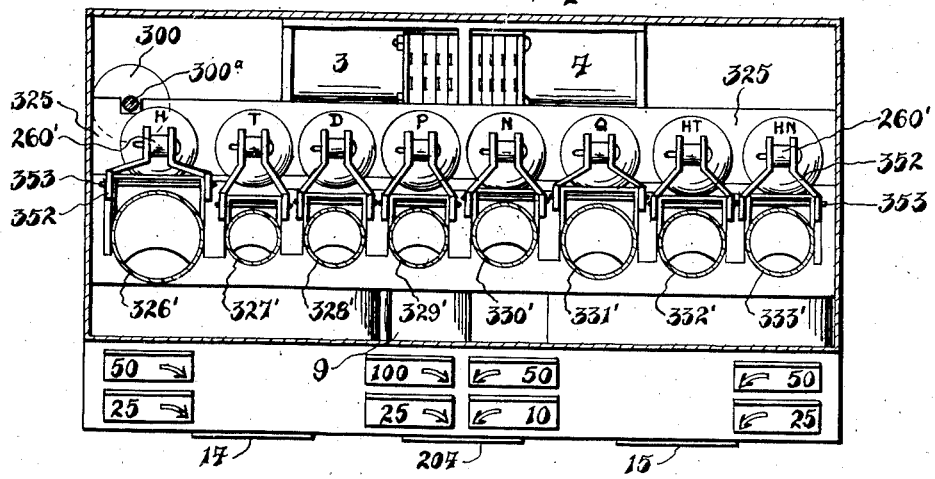
Figure 8:
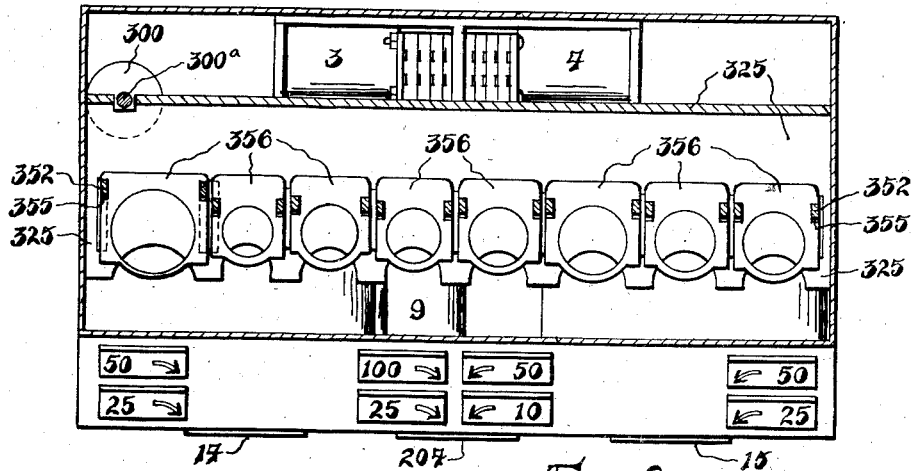
Figure 9:
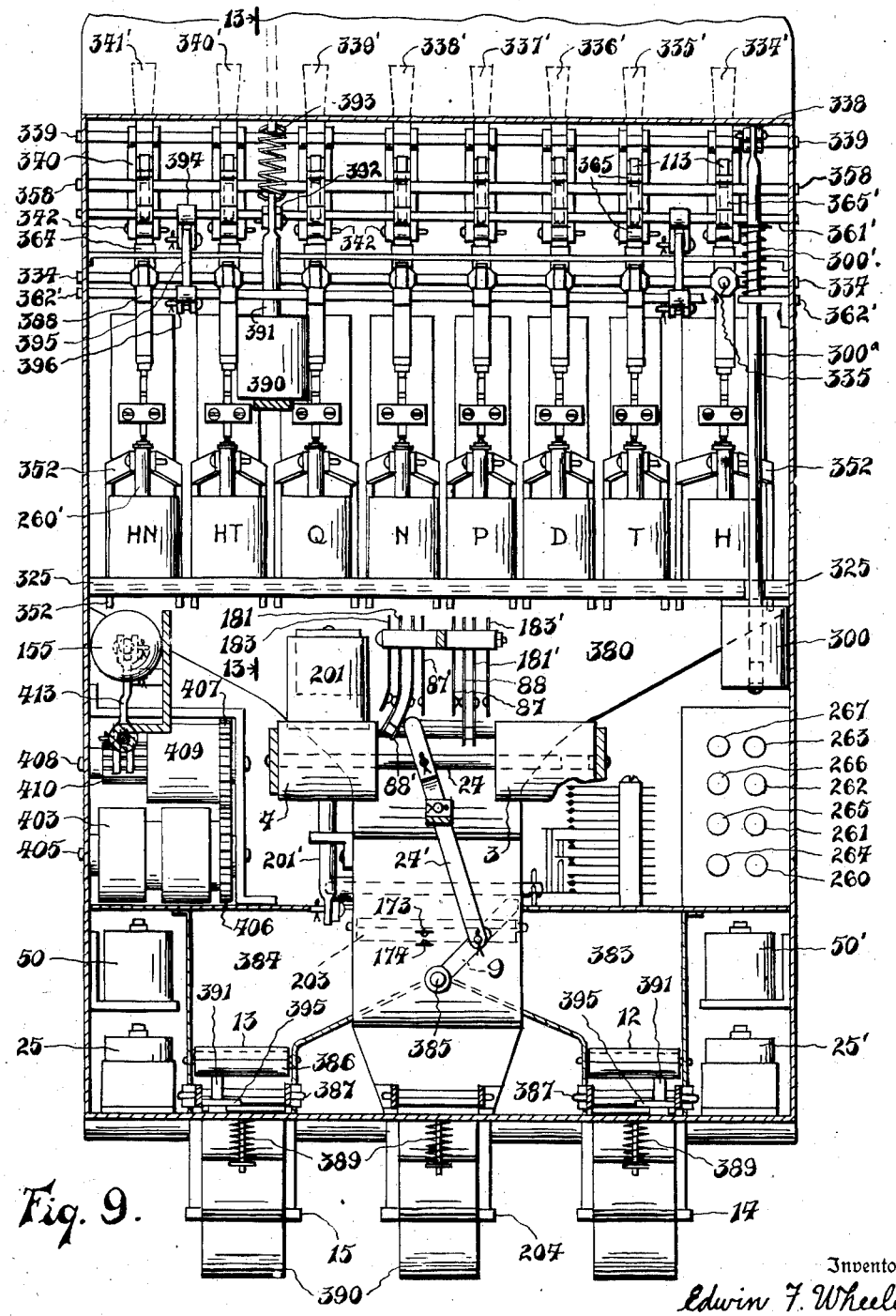

Figures 7 and 8, respectively, are cross sectional views taken on the line 7—7 and 8—8 of Figure 6;

Figure 9 is an enlarged view of the apparatus looking from the rear, with the rear wall of the casing removed to disclose details; and Figures 10 and 11 are enlarged vertical sectional views taken at a right angle to each other and illustrating the transfer mechanism, and Figure 12 is a detail sectional view taken substantially on the line 12—12 of Figure 10.

Figure 13 is a detail sectional view taken on the line 13—13 of Figure 9, illustrating the automatic no-current locks.

Figure 2:
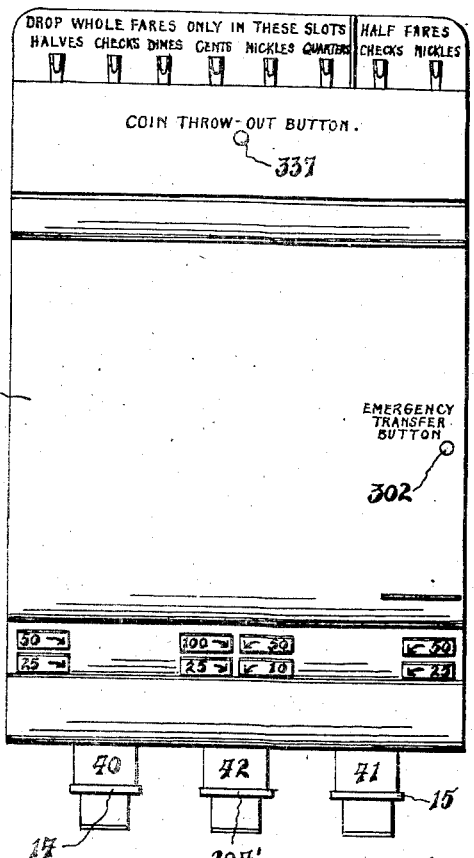
Figure 3:
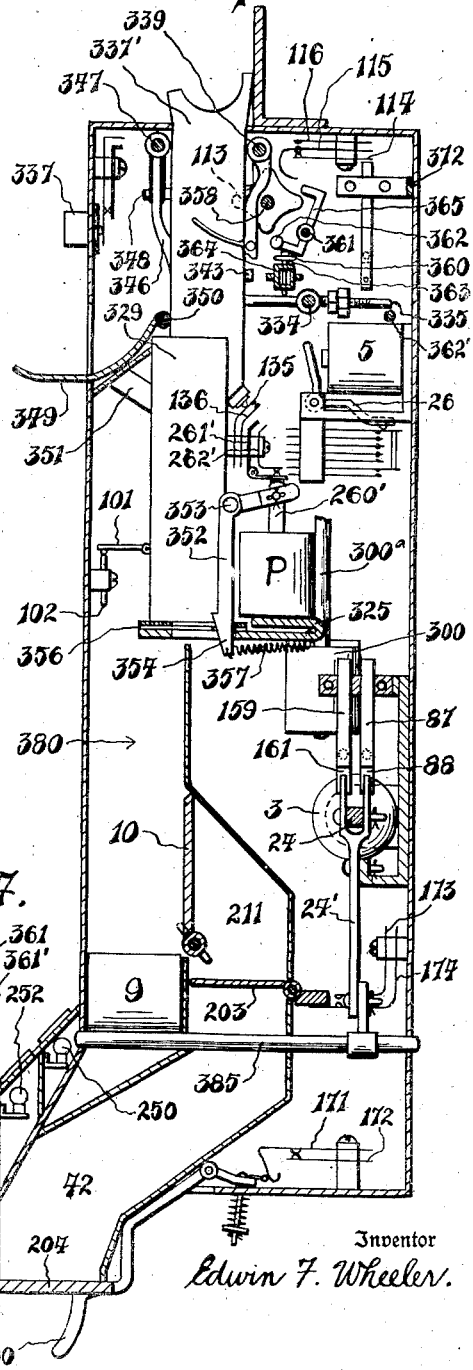

Referring specifically to the drawings, a suitable casing A is provided, made sectional or with doors as preferred, so that the interior part will be accessible. Suitably supported within the casing, for instance on a shelf 325 are a series of coin tubes 326', 327', 328', 329', 330', 331', 332' and 333', respectively, having chutes 334', 335', 336', 337', 338', 339', 340' and 341', into which for example, respectively, may be deposited, as shown in Figure 2, half dollars, metallic checks constituting a fare or admission, dimes, cents, nickels, quarters, metallic checks for half fares and nickels for half fares. A rod 334 extends across the casing near the top and has a plurality of fingers 335 pivotally mounted thereon, with the greater weight of the fingers 335 in the rear of the pivots so that the forward end will be held by gravity in engagement with the upper wall of slots 336 in the coin chutes and in which slots the fingers move to release a coin.

When a coin is deposited into the chute, the same, if of the proper weight will overbalance the finger 335 and fall from the chute to the bottom of the coin tube there beneath, resting on the shelf 325. In the event a coin which is too light in weight to operate the machine is deposited into the chutes the same will simply rest on the free end of the fingers. The conductor or other person having supervision of the apparatus may then operate an electric switch 337 in order to cause ejection of such light coin. The action is best seen in Figure 4 where a throw out solenoid by means of a crank 338 actuates a transverse rock shaft 339 to which a plurality of cranks 340 are fixed, each having an ejector plate 341 pivoted thereto at 342, balance weights 343 being provided on the ejector plates to normally maintain them vertical. An ejector plate is provided for each chute and the same is movable into the dotted line position of Figure 4 in order to eject a spurious coin through a discharge opening 344, normally closed by plate 345 carried by levers 346, pivoted on a cross rod 347. A link 348 connects the transverse rock shaft 339 and the crossrod 347, being pivoted to the crank 338 and the crank 349'. Upon the deenergization of the throw out solenoid 300, the said part of the ejecting mechanism will automatically return to normal position by aid of the spring 300'.

The ejected spurious coins are adapted to fall into a trough or tray 349 pivoted within the casing as at 350.

Should any other coin chutes need replenishing with coins, in order to give change, as hereinafter pointed out, additional coins may be supplied thereto through chutes 351, one being associated with each coin chute, and all being normally closed by the trough 349. Such trough is elevated when coins are deposited through the chutes 351. The trough normally conceals the chutes 351.

The deposited coins remain in the cylinders 326' to 333' until ejected by the conductor or custodian through the medium of mechanism placed in operation through the closing of electric switches individual thereto as will be later specifically set forth.

It will be noted that an ejector lever 352 is provided for each coin cylinder, being pivotally mounted as at 353 adjacent the cylinder and the same being operable by electro-magnets H, T, D, P, N, Q, HT, and HN, respectively, associated with the tubes 326' to 333'. A pair of said levers 352 are connected to each core of said magnets and they have terminals 354 which fit in slots 355 of coin discharge plates 356, such plates being cut away, preferably arcuately as shown, in order to fully surround and engage coins which rest on the aforesaid shelf 325. Said shelf mounts the said electro-magnet and the action of the magnet is to rock the bell crank levers 352 in a manner to move their free ends forwardly and accordingly move the discharge plate 356 accordingly, each movement of a discharge plate moving a coin out of the coin tubes and off of said shelf 325. Return coin springs are provided at 357 in order to maintain the bell crank levers and discharge plates 356 retracted.

Also it will be noted that although this fare box is designed to be used when the fare or admission is ten cents and the half fare or admission is five cents it is the intention of the inventor that this fare box may be used for any amount of fare or admission such as six cents, seven cents, fifteen cents, twenty-five cents, etc. Therefore, if the amount of the fare is seven cents, and a quarter were dropped into the box, the passenger or customer, as the case may be, would have to receive eighteen cents change, including a dime, nickel and three pennies. In this case the penny cylinder 329' would require three discharge plates 356 instead of one as is shown on the drawings, and the length of the said cylinder would of course have to be shorter to provide for the two additional discharge plates 356. These plates would be designed to pin together in such a manner as to keep them in alignment; or a discharge plate equal in thickness to three pennies would be used, so that when the penny electro-magnet P is energized and the pair of associated levers 352 are rocked moving the discharge plates 356, three pennies will drop into the chute 380, along with a dime from the cylinder 328' and a nickel from the cylinder 330', making a total of eighteen cents change.

Means are provided for automatically returning change through the deposit of a half dollar in the chute 334' or a quarter in the chute 339', no change being automatically given in the case of the deposit of coins in other chutes. A shaft 358 is suitably journaled behind the coin chutes and it has coin engaging wheels 113 thereon each equipped with four lobes or cams, adapted to extend through slots 359 in the chutes 334' and 339'. The coins deposited in such chutes will engage the lobe or cam extending into the same, thereby turning the wheel 113 of the respective chute and thereafter engaging the finger 335 in its path, moving the free end of the finger downwardly so that the coin disengages the same, then engages slidable switch actuating members 72 and 72', mounted on the cylinders 326' and 331' for the half dollars and quarters, respectively, such members 72 and 72' closing contacts 77 and 78 and contacts 77' and 78' respectively. A substantially U shaped detent 365 is provided for each wheel 113, the same being journaled on a shaft or rod 361 and normally urged into detaining engagement with the wheels 113 by springs, weights or the equivalent as at 362. Normally the detents 365 are disengaged from the wheels 113 by pins 363 slidably mounted in one or more brackets 364, and which pins are held in uppermost position by the adjacent fingers 335. Thus after the deposit of a coin and its actuation of wheel 113, and engagement with the fingers 335 beneath the same, lowering of such fingers and release of the coin, the pin 363 is permitted to fall, its movement being limited by a stop 360. Thereupon the means 362 is free to move the detent 365 to the left and into detaining engagement with the wheel 113 coacting therewith.

The movement of the wheels 113, both of which wheels are journaled on the shaft 358, controls switches, the wheel 113 for the half dollar, coacting with a switch represented by contacts 31 and 32 and the wheel 113 for the quarter chute coacting with a switch represented by contacts 31' and 32'.

Electro-magnets 1 and 2, suitable relay circuit hereinafter specifically traced, control lock bolts 29 and 30, adapted for sliding movement over or under the fingers 335 of the half dollar and quarter chutes as traced hereinafter. Such bolts are slidably mounted in brackets 371 and 372 and normally urged out of locked position with said fingers 335 by coil springs 373 and 374, respectively. Levers 375 and 376 are pivoted to the bolts and at 377 and 378 are pivoted to the frames of the electro-magnets 1 and 2 respectively. Thus upon energization of the magnets 1 and 2 the bolts 29 and 30 will be thrown into locked position, that is, will lock the adjacent fingers 335.

If two quarters or half dollars are dropped one behind the other in their respective chutes 339' and 334', the first coin drops past the wheel 113 in its course, to the associated finger 335 and when the latter drops it operates a mechanical lock or detent 365 on the wheel 113 in question, preventing the second coin from dropping too. After the first coin has dropped and its change has passed releasing gates 12 and 13 (to be hereinafter specifically described), as the case may be, the lock relay 1 or 2 releases, allowing the finger to return for the second coin. As the finger raises, it strikes against the pin 363 which strikes the detent 365, rocking the same on its shaft 361 and thus retracting it, thereby allowing the said wheel 113 to turn, which in turn allows the second coin to drop past the wheel 113. This mechanical locking feature for the wheels 113, therefore, insures the dropping of but one coin at a time, although two or three coins may be deposited in the chute at once, one behind the other.

The coins from all of the tubes 326' to 333', whether discharged automatically as change for the quarters and half dollars, or whether discharged through actuation by the conductor or custodian, are discharged into a chute 380, the same having downwardly and inwardly converging bottom walls 381 which provide a restricted central portion 382. Said chute has branches 383 and 384, terminating respectively in discharged portions 40 and 41. In the said chute 40 the gate or valve 12 is provided while the aforesaid gate or valve 13 is provided in the discharge chute 41. A gate or valve 9 is pivotally mounted at 385 in the central portion 382 of the chute 380 and it is movable to either side of its axis so as to deflect coins into the chute 40 or 41 as the case may be, the shifting of such gate occurring as hereinafter specifically traced.

All change for full fare is discharged either automatically or through the action of the conductor or attendant into the chute 380 and according to the positions of the gate 9, the same is deflected onto the plates 12 and 13. As will be hereinafter seen, the change irrespective of the amount or cylinder from which it is given, for successive operations of the machine, alternately is deflected through the said plates 12 and 13 after which the same is released upon the opening of closures 14 and 15, respectively.

Due to the electrically operated relay solenoids 7 and 8, the change dropped in either chute 40 or 41 must first be taken out by opening the doors 14 and 15 before any more change from quarters or halves will again drop into the respective chutes. It will be noted that the gates 12 and 13 are pivotally mounted as at 385' and have weights 386 thereon which normally maintain them in a horizontal position but which will be overbalanced by the weight of coins thereon. The doors or closures 14 and 15 are pivotally mounted as at 387, having arms 388 with which spring devices 389 are associated to normally urge the closures 14 and 15 to closed position. Finger pieces 390 may be provided on such closures 14 and 15. The plates 12 and 13 have lugs 391 thereon which are adapted to be engaged by the rod 395 to prevent the opening of these plates while the closures 14 and 15 are being opened to release change thereon. Locking levers or latches 16 and 17 are pivoted at 393 and are normally held in open position by spring means 394. If quarters are dropped in the chute 339', the same will be changed, the fare or admission received and registered by means of a whole fare register WOD an audible signal 160 in circuit therewith, giving the signal and such change as previously set forth alternately dropped into the discharge chutes 40 and 41.

If half dollar coins are dropped in the chute 334', they will also actuate the register WOD, signal 160, and the change alternately drops in the same receptacles 40 and 41.

Figure 1:
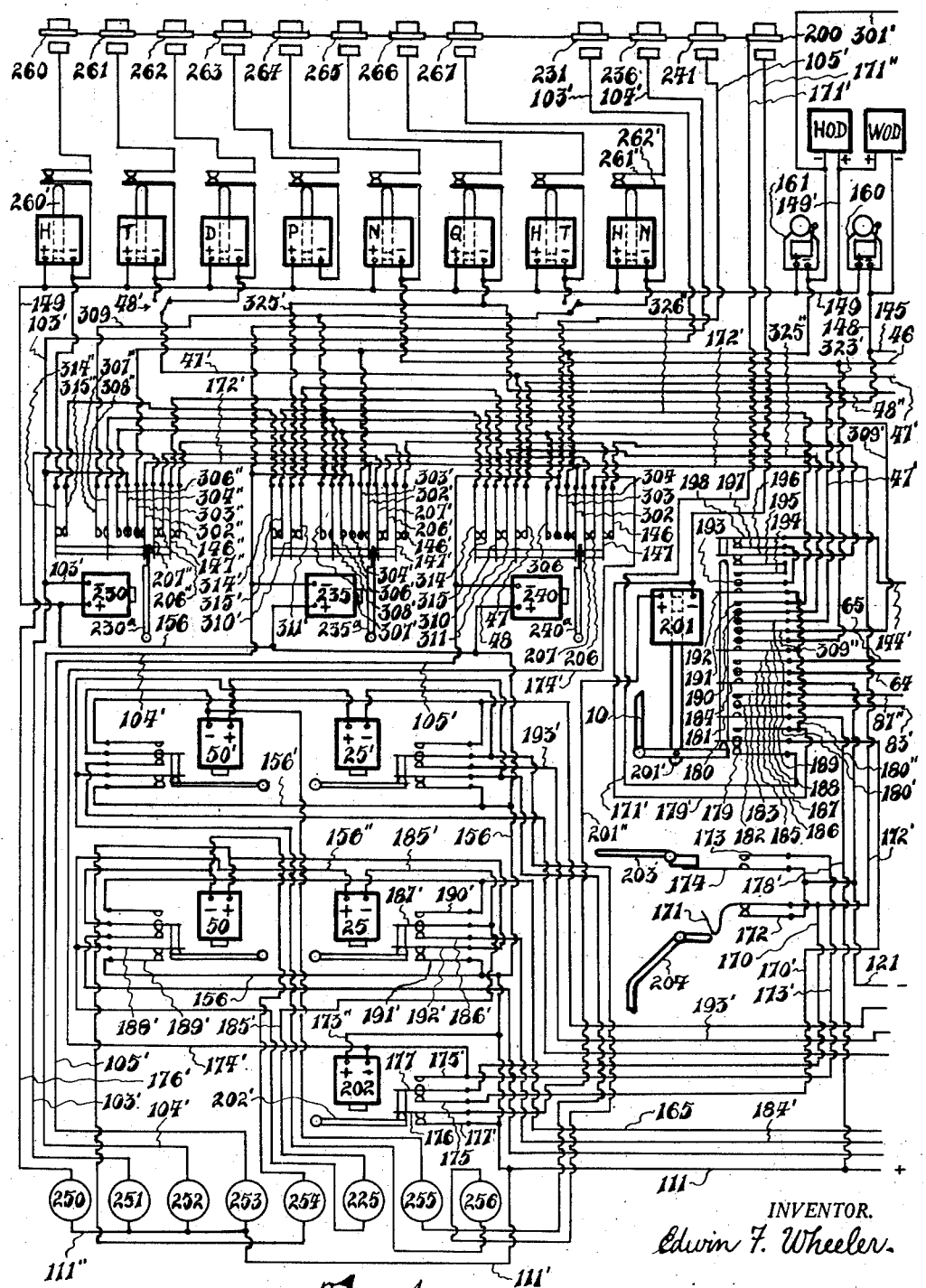

More specifically with respect to the operation just referred to, and with reference to Figure 1—A, the position of the finger 335 in the quarter chute, shows that a quarter has been dropped and gate 9 is shown in the position to drop its change into the receptacle 41. As soon as such change passes the gate 13, the gate 9 will swing over and open the passage to receptacle 40 and the lock relay 1 will release allowing a half dollar to drop. Its change will pass the gate 9 into the receptacle 40. As soon as such half dollar change has passed the gate 12, the gate 9 will swing back, opening the passage or chute to receptacle 41 again and if the quarter change has previously been removed from the said receptacle 41, the lock relay 2 will release allowing another quarter to drop. Its change will drop through gates 9 and 13 into receptacle 41. As soon as this change has passed the gate 13 the gate 9 will again swing back into position to open the passage to receptacle 40 and if the change in this receptacle has previously been removed, the lock relay 1 will release allowing the next half dollar to drop, and so on as long as quarters and halves are supplied and their respective change removed from the receptacles 40 and 41.

If no more quarters are dropped in the box and half dollars are dropped in the box, then after the last mentioned half dollar change has passed the gate 12, the gate 9 will again swing over to open the passage to receptacle 41 and the lock relay 1 will release allowing the next half dollar to drop. The half dollars will then continue to drop their change alternately into the receptacles 40 and 41 as long as this change is each time removed from the receptacle.

If no more half dollars are dropped in the box and quarters are dropped then such quarters will continue to drop their change alternately into the two receptacles 40 and 41 just as fast as their change is removed from the receptacles. As the change from the quarters and half dollars drop practically instantaneously, the speed at which the box will operate depends on the speed of removal of the change from the receptacles.

As will be further explained later, after the change of a quarter or half dollar has passed either of the gates 12 or 13, as the case may be, lock relays 7 and 8 are electrically operated locking these gates 12 or 13 in their closed position by means of the catches 16 or 17. The lock relays 7 and 8 are released when the closures 14 or 15 are opened and the change removed.

The following action actually takes place as regards the electrical and mechanical lock, the functions of the various relays and the current traced through the wiring step by step in order to bring about the automatic changing, registering and disposal of transfers or admittance tickets depending on whether the box is used as a fare box for street cars, busses, or as an admission box for theatres, shows, exhibitions, etc.

Assuming that two quarters and two halves are dropped in their respective chutes and starting the operation of the various parts in the positions as shown in Figure 6, the two bottom coins will drop turning the wheels 113 and closing the contacts 31 and 32 of the half dollar assembly, and the contacts 31' and 32' of the quarter assembly, respectively. Negative current then flows from the negative side of the electric source 106 through wires 120, 121, 122, and 60 to the contacts 31 and 32 and wires 61 and 64 to the negative side of the lock relay 2, also to the contacts 31' and 32' and wire 62 to the negative side of lock relay 1. Also positive current flows from the source 106 through fuse 112, wires 111, 110, 109, 109', 80, 81, and 81', normally closing contacts 34 and 33, wires 87" and 82 to the positive side of the lock relay 2, completing the circuit thereto and energizing it, drawing its armature 2' which throws the lock bar 30 across over the finger 335 and prevents it from dropping. This bar 30 also at the same time opens the contacts 33' and 34' which break the positive current to the lock relay 1. Simultaneously the positive current flows from wire 81' and normally closed contacts 34' and 33', wire 83 to the positive side of the lock relay 1, completing the circuit to it and energizing it, drawing its armature 1' which throws the lock bar 29 across over the finger 335' and prevents it from dropping. This bar 29 at the same time opens the contacts 33 and 34 which breaks the positive current to the lock relay 2.

Therefore, if a half dollar and quarter are dropped at the same time, both lock relays simultaneously lock the fingers 335 and 335' associated therewith preventing them from dropping with either coin but as is shown in Figure 1—A, when the gate solenoid bar 24' is in this position the contacts 87' and 88' are open but the contacts 87 and 88 are closed thereby acting as a by-pass around the contacts 33' and 34' and supplying positive current through 83' and 83 to the positive side of the lock relay 1. The locking of the two relays 1 and 2 are therefore momentary, the lock relay 1 staying energized by a maintained negative current through contacts 35 and 36 thereby keeping the lock bar 29 across over the finger 335' preventing it from dropping, while the lock relay 2 becomes deenergized allowing the finger 335 to drop with the quarter. The quarter then drops with the finger 335 until the finger reaches a 45 degree angle when the coin will drop into the cylinder and the finger 335 bearing against the plunger 72' closes the contacts 77' and 78' which allows negative current to flow through wires 120, 121, 122 and 122' through contacts 91' and 92', wire 70, contacts 91 and 92, wires 71, 71', 72'', 75 and 75' to the negative side of the relay 6. As positive current is permanently connected to this relay through wires 111, 110, 109, 109', 80 and 86, the relay 6 is energized and closes the contacts 97', 96' and 95' which allows the negative current to flow from wires 71 and 79' to the contacts 95' and 96' and wire 75' to the negative side of the said relay 6 thereby keeping it energized as long as the contacts 91' and 92' and 91 and 92 are closed. The said relay 6 also closes contacts 96' and 97' which supplies negative current through wires 63, 63' and 64 to the negative side of lock relay 2 and as the contacts 87' and 88' are open with the gate 9 in position to the receptacle 41, no positive current flows to the positive side of the lock relay 2, but when the relay 6 becomes energized it closes contacts 100' and 105' which supplies positive current from wires 109' and 84' through contacts 105' and 100', wires 84, 82' and 82 to the positive side of the lock relay 2, it then therefore becomes energized locking finger 335 in its dropped position by means of the lock bar 30 being drawn across under the finger 335.

The relay 6 also closes contacts 98' and 99' which supplies negative current from wire 122 and 123'' through contacts 99' and 98', wires 66, 62' and 62 to the negative side of lock relay 1 and as the positive current is supplied from wire 80 through contacts 87 and 88, which are closed when the gate 9 is open to receptacle 41, wires 83' and 83 to the positive side of lock relay 1; thereby energizing it and causing it to lock finger 335' by means of the lock bar 29 being drawn across over the last mentioned finger and preventing it from dropping the half dollar coin which is resting on the said finger 335'. Simultaneously with the aforesaid mentioned contacts engaging, the relay 6 closes the contacts 42', 43', 44' and 45' which allows negative current to flow from the source 106 through wires 120, 121, 122, 122', contacts 91' and 92', wire 70, contacts 91 and 92, wires 71 and 79' through contacts 42', 43', 44' and 45' through wire 177', contacts 178' and 182', wire 184', contacts 186' and 187' and wire 185' to the pilot light relay 25 and pilot light 225; through wire 47' and two-way switch 48', to the negative side of the dime solenoid D; and through wire 46 to the nickel solenoid N. Also the contacts 51', 52', 53', 54', 55', 56' and 57' are operated by the relay 6 in such a manner that a momentary negative impulse is carried to the whole fare odometer WOD and its signal 160, and the transfer solenoid 155 in the following manner: When the coil 6 attracts its arm 26', the said arm releases the spring tension on contact 57' until it closes with contact 56' and 55' and as the contacts 51' and 52' and 53' and 54' are closed a momentary negative impulse is sent to the whole fare odometer WOD, its signal 160 and the transfer solenoid 155. As the arm 26' continues to be drawn to the coil 6 its extension 26'' bears against the contact 53' and as contacts 53' and 51' are connected together by an insulated pin 27' the contacts 51' and 53' are opened from their respective contacts 52' and 54'. Then as long as the relay 6 stays energized the odometer, odometer signal and the transfer solenoid circuits are opened in respect to the relay 6, so that if a dime, ten cent token, two nickels or a half fare token or nickel is dropped in the box they will register and issue a transfer and not have to wait until a quarter or half dollar is changed.

Of course when the relay 6 becomes deenergized, these contacts return to their normal positions. Therefore, the energizing of relay 6 by the closing of contacts 77' and 78' accomplishes the following: (1) It is maintained energized until the change is dropped through the gate 13, which breaks the negative current by opening the contacts 91' and 92'. (2) The lock relays 1 and 2 are energized and prevent any more coins (either quarters or half dollars) from dropping and both stay energized until the change has dropped through the gate 13. (3) The dime and nickel solenoids are energized causing a change of fifteen cents to drop through the gates 9 and 13 into the receptacle 41. (4) A momentary impulse is sent to the odometer and its bell signal registering the fare or admission. (5) A momentary impulse is sent to the transfer solenoid 155 which issues a transfer or admission ticket to the customer. (6) The twenty-five cent change pilot light is illuminated over the receptacle 41 indicating that change for a quarter is resting in that receptacle.

In continuing the operation, when the change has dropped past the gate 13 the contacts 91' and 92' are opened causing the deenergizing of the lock relays 1 and 2 and the relays 6, and the contacts 91' and 90' are closed supplying negative current through wires 157 and 157'' to the negative side of the lock relay 8, also through contacts 153'' and 152'', wires 158 and 158', closed contacts 159 and 161, to the negative side of the gate solenoid 3. As both coils 8 and 3 have their positive side connected to the source 106 they become energized, the solenoid 3 attracts its armature 24 which moves the arm 24' causing the gate 9 to swing over and open the passage to the receptacle 40; and the relay 8 attracts its armature 19 which in turn locks the gate 13 by means of the latch 17, and the said armature 19 also breaks the contacts 162' and 163' and closes the contacts 154'' and 156'' which supplies negative current to relay 8 and keeps it energized. The fifteen cents change for the quarter then rests in the receptacle 41 and, as soon as the customer opens the door 15 to take it out, the back end 15' of the door 15 bears against the curved end of the contact 93' breaking it away from the contact 94', thereby breaking the circuit on the negative side to relay 8 which becomes deenergized releasing the catch 17 and unlocking the gate 13. The circuit is also broken to the twenty-five cent pilot light.

Reverting to the instant when the change has dropped past the gate 13 and the normally closed contacts 91' and 92' were opened by this action, the half-dollar which was resting on the finger 335' drops, when the lock relay 1 was deenergized, with the finger 335' until they have reached the 45 degree position when the half dollar drops into its cylinder and the finger 335' bears against the plunger 72, closing the contacts 77 and 78 which supplies negative current to the relay 5, which attracts its armature 26 opening and closing the same contacts as relay 6 does with the addition of the contact 45" which supplies negative current to the quarter solenoid Q.

The energizing of this relay 5 therefore accomplishes the following actions:

(1) It is maintained energized until the change is dropped through the gate 12, which breaks the negative current by opening the contacts 91 and 92.

(2) The lock relays 1 and 2 are energized and prevent any more coins (either quarters or halves) from dropping, and both stay energized until the change has dropped through the gate 12.

(3) The dime, nickel, and quarter solenoids, D, N, and Q, respectively, are energized causing a change of forty cents to drop through the gates 9 and 12 into the receptacle 40.

(4) A momentary impulse is sent to the odometer and its bell signal registering the fare or admission.

(5) A momentary impulse is sent to the transfer solenoid 155, which issues a transfer or admission ticket to the customer.

(6) The fifty cent change pilot light is illuminated over the receptacle 40, indicating that change for a half dollar is resting in that receptacle.

Then when this forty cents change has dropped past the gate 12 the contacts 91 and 92 are opened causing the deenergizing of the lock relays 1 and 2 and the relay 5, and the contacts 91 and 90 are closed supplying negative current through wires 164 and 164" to the negative side of the lock relay 7, also through contacts 153' and 152', wires 161" and 162", closed contacts 159' and 161', to the negative side of the gate solenoid 4. As both coils 7 and 4 have their positive side connected to the source 106 they become energized, the solenoid 4 attracts its armature 24, which moves the arm 24' causing the gate 9 to swing over and open the passage to the receptacle 41, and the relay 7 attracts its armature 18 which in turn locks the gate 12 by means of the latch 16, and the said armature 18 also breaks the contacts 162 and 163 and closes the contacts 154' and 156' which supplies negative current to relay 7 and keeps it energized.

The forty cents change of the half dollar then rests in the receptacle 40, and as soon as the customer opens the door 14 to take it out the back end 14' of the door 14 bears against the curved end of the contact 93 breaking it away from the contact 94, thereby breaking the circuit, on the negative side, to relay 7, which becomes deenergized releasing the catch 16 and unlocking the gate 12. The circuit is also broken to the fifty cent pilot light and it goes out. The instant that the half dollar change passes the gate 12 and it breaks the contacts 91 and 92, the lock relay 1 releases to allow the finger 335' to return and pick up another half dollar, while the lock relay 2 releases to allow the finger 335 to drop with another quarter. This quarter drops into its cylinder and its change drops past the gate 13 into the receptacle 41 as previously explained.

If the first quarter and half dollar have dropped and their change is left resting in the receptacle 41 and 40, respectively, the second quarter change will drop as far as the gate 13, but as it is locked by the lock relay 8 and its catch 17 when the change for the first quarter dropped past the gate 13, this change will rest on the gate 13 until the door 15 is opened and the operation of the changing of quarters and halves will stop until either the door 14 to the receptacle 40, or the door 15 to the receptacle 41 is opened and the change in it removed.

With the condition as above explained when the change for the first quarter still rests in receptacle 41, and the change for the first half dollar still rests in the receptacle 40, with the change of the second quarter resting on the lock gate 13 the gate 9 is in the position opening the passage to the receptacle 41, therefore, if the change for the first quarter is then removed from the receptacle 41 this action will cause the relay 8 to be deenergized releasing the lock 17 on the gate 13 and allowing the change for the second quarter to drop in the receptacle 41, but if the change for the half dollar is first removed from the receptacle 40, with the gate in position to open the passage to the receptacle 41, the opening of the door 14 will open the contacts 93 and 94 which will deenergize the relay 7 and cause the two contacts 162 and 163 which are open when this relay is energized, to close thereby allowing negative current to flow from the source 106 through wires 120, 121, 122 and 122', contacts 93' and 94', wire 165, the contacts 156" and 154", which are closed as the relay 8 is energized, the wire 157, through contacts 162 and 163, wires 158 and 158', and contacts 159 and 161 which are closed with the gate 9 in its present position, to the negative side of the gate solenoid 3, which becomes energized swinging the gate 9 to open the passage to the receptacle 40. In this last mentioned operation when either of the relays 7 or 8 are energized the contacts 152' or 152" are free from contact with their respective contacts 153' and 153", therefore, if either of these relays are energized, these contacts will momentarily close energizing the gate solenoid to swing the gate to open the passage to the receptacle of the other side, and when either of these relays are deenergized while the other is energized the contacts 162 and 163 or the contacts 162' and 163', as the case may be, close, energizing the gate solenoid to swing the gate 9 to open the passage to the receptacle on the side of the deenergized relay.

*Dollar change operation*

When this box is to be used on a street car, bus, or the like where a motorman, driver or the like is in attendance, and a passenger tenders a dollar or five dollar note to be changed, the motorman presses a button 200, conveniently located nearby, which allows the negative current to flow from the source 106, through wires 120 and 121, contacts 172 and 171, wire 170, normally closed contacts 177 and 175, wire 170' closed contacts 180 and 179, wire 171' to one side of the button 200 and from the other side of button 200, the wire 171" to the negative side of the gate solenoid 201, and as the positive side of this solenoid is connected through the wire 201" and normally closed contacts 176 and 177', of the relay 202 and wire 111 and through the fuse 112 to the positive side of the source 106, this solenoid 201 becomes energized attracting its armature 201' which throws the gate 10 across the passage 380 closing the way to either of the two receptacles 40 or 41 and opening the way through passage 211 to the receptacle 42.

The armature 201' likewise opens and closes the various contacts associated with the solenoid 201 to accomplish the following action:

(1) The contact 180 opens from the contact 179 disconnecting the negative current to the buttons 200, 241, 236 and 231 and closes with the contact 180' which then carries the negative current from the contact 180' through wire 179' to the negative side of the solenoid 201 maintaining it energized.

(2) Positive current is supplied from the wires 111 and 178', through contacts 181, 182, and 183, through wires 83' and 87, to the positive side of the lock relays 1 and 2, respectively.

(3) Negative current is supplied from the wires 120 and 121 through the contacts 184, 185, and 186, through wires 64 and 65, to the negative side of the lock relays 2 and 1. The two lock relays 1 and 2 therefore are energized to prevent any quarters and half dollars from dropping to make change while the dollar change is in operation.

(4) Negative current is supplied from the contact 180', wire 180'', through contacts 187, 188, 189, 190 and 191 to the nickel solenoid N, dime solenoid D, quarter solenoid Q, and the half dollar solenoid H, respectively. The energizing of these solenoids drops a coin from each which totals ninety cents change which drops down through the gate 10 and past the gate 203 into the receptacle 42.

(5) A momentary impulse is sent to the whole fare odometer WOD and its signal 160, by the closing of the contacts 192, 193, and 194 allowing the negative current to flow from the wire 180'' through these contacts and the closed contacts 195 and 196, wire 145, normally closed contacts 146 and 147, 146' and 147', and 146'' and 147'', and wire 148 to the negative side of the signal 160 and whole fare register WOD.

(6) A momentary impulse is sent to the transfer solenoid 155, by closing of the contacts 192, 193 and 194 allowing the negative current to flow also from wire 180'', through these contacts and the closed contacts 197 and 198, the wires 144' and 144, the normally closed contacts 150 and 151, wire 152, to the negative side of the transfer solenoid 155. As the positive side of this solenoid is connected directly to the positive side of the source 106 through wires 153, 110, 111 and fuse 112, this solenoid becomes energized and issues a transfer to the passenger.

The action of this set of contacts which sends a momentary impulse to the odometer, its signal and the transfer solenoid is exactly similar to the other sets of contacts associated with the relays 5, 6, 130, and 130'.

When the ninety cents change drops past the gate 203, it allows the tensioned spring contact 174 and contact 173 to close, supplying negative current from wires 120 and 121, through contacts 174 and 173, wires 173' and 174' to the negative side of the relay 202. As the positive side of this relay is connected to the positive side of the source 106 through wires 111 and 173'', it becomes energized closing contacts 177 and 175' which supplies the relay 202 with negative current maintaining it in energization. Also the normally closed contacts 175 and 177 are opened breaking the negative side of the source 106 to the solenoid 201 which becomes deenergized and allows the gate 10 to move back into its normal position closing the way to passage 211 and receptacle 42, and opening the way to the passage 380 and receptacles 40 and 41. Also as the one dollar pilot light is connected by wire 174' in series with the closed contacts 206 and 207, 206' and 207' and 206'' and 207'', and the wire 176' to the negative side of the pilot light 250 and as the positive side of this light is connected to the positive wires 111'', 111' and 111, this light is illuminated and stays illuminated indicating that a dollar change is resting in the receptacle 42, until the change is removed by the opening of the door 204, which opens the contacts 171 and 172 and breaks the negative side to the relay 202, and pilot light 250 deenergizing them.

It will be noted that the negative current from the source 106 is controllable by the buttons 200, 241, 236 and 231 when the relays 201 and 202 are normally deenergized, but when the relay 201 is energized the opening of the contacts 180 and 179 breaks the current to the said buttons, while when the relay 202 is energized the opening of the normally closed contacts 175 and 177 also breaks the current to the buttons, preventing the operation controlled by any of these buttons until the change has been removed from the receptacle 42, and the door 204 has opened, the contacts 171 and 172 putting all relays, contacts, etc. in their normal positions.

*Pilot lights and their operation*

Over the said receptacles or discharge chutes 40 and 41 are two pilot lights 25 and 50, indicating whether a quarter or half dollar change is resting in the receptacle 40 or 41. The energizing of these lights are accomplished in the following manner: When the quarter relay 6 is energized the closing of contacts of 42' and 43' sends negative current through the wire 177' to contacts 178' and 182'. If the gate 9 is in position to open the passage to the receptacle 41 then the contacts 178' and 182' are closed and negative current flows through the wire 184' to the contact 186', through normally closed contacts 186' and 187' and wire 185' to the negative side of the relay 25 and pilot light 225. As the positive side of this relay is connected to the positive side of the source 106, through the wires 156'', normally closed contacts 188' and 189', wires 156, 111, and fuse 112, this relay 25 is energized opening the contacts 186' and 187' and closing the contacts 187' and 190', supplying negative current from the contacts 93' and 94', wire 185 to the contacts 190' and 187', and wire 185' to the negative side of relay 25 maintaining it in energization and as pilot light 225 is also connected across the relay 25 it will stay illuminated until the quarter change is removed from the receptacle 41 and the contacts 93' and 94' are opened thereby.

Also contacts 191' and 192' open, which breaks the circuit on the positive side of the half dollar pilot light relay 50 and pilot light 254, preventing them from being energized when the pilot light relay 25 and pilot light 225 is energized. Likewise, if the gate 9 is in position to open the passage to the receptacle 40 then the contacts 181' and 183' are closed and negative current flows through wire 193' to energize the quarter pilot light relay 25' and pilot light 256, which indicates quarter change in the receptacle 40. The operation of the relays 25' and 50' are identical to the relays 25 and 50 which indicate change in the receptacle 41.

If the half dollar relay 5 is energized the closing of contacts 42 and 43 sends negative current through the wire 194' to contacts 178 and 182. If the gate 9 is then in position to open the passage to the receptacle 40 the half dollar change will drop in this receptacle, therefore a pilot light 255 must light to indicate this. Likewise if the gate 9 is in position to open the passage to the receptacle 41 the half dollar change will drop in this receptacle, therefore, the pilot light 254 must light to indicate this.

Attention is called to the fact that the pilot lights are connected in parallel with their relays, the relays being used to keep the lights illuminated until the change is removed from the receptacles. Also the relays 25 and 50, and the relays 25' and 50' are electrically interlocked one with the other on the positive side through the set of normally closed contacts in each relay, which open when a relay is energized breaking the positive side to the other relay.

These pilot light relays therefore work in two sets, each set exactly identical to the other and composed of a quarter indicating relay and a half dollar indicating relay. The relay 25 and light 225 indicate quarter change in the receptacle 41, and the relay 25' and light 256 indicate quarter change in the receptacle 40. The relay 50 and light 254 indicate half dollar change in the receptacle 41 and the relay 50' and light 255 indicate half dollar change in the receptacle 40.

*Actuation of transfer and register relays TO and THO*

When a dime, two nickels or a ten cent token is dropped in its respective slot the coin as it drops past the wheels 113 therein revolves this wheel in a counterclockwise direction and one of the four cams on it bears against the light bronze spring contact 114 which breaks connection with the contact 115 and closes with the contact 116, thereby allowing negative current to flow from the negative side of the source 106 through wires 120, 121, 122, contacts 114", 115", which are normally closed, wire 123, normally closed contacts 114' and 115', wire 124, the contacts 114 and 116, wires 125, 126, and 126', the negative side of the coil 130. As the positive side of the source 106 is connected by fuse 112, wires 111, 110, 109, 108 and 108' to the positive side of the coil 130 it becomes energized and draws its armature 131 which closes the contacts 132 and 133. The closing of these contacts allows negative current to flow from the source 106, through wires 120, 121, 122, contacts 114" and 115", wire 123, contacts 114' and 115', wire 124, contacts 114 and 115, which immediately closed after the said coin had dropped past the wheel 113 and broke these contacts, wire 127, normally closed contacts 135 and 136, wire 128, contacts 135' and 136', wire 129, contacts 135" and 136", wire 134, the said contacts 132 and 133, the wires 126 and 126' to the negative side of coil 130 and as the arm 131 holds the contacts 132 and 133 closed the coil 130 is kept energized. Simultaneously the arm 131 closes the contacts 137 and 138 which sends the same negative current from wire 134 through the contacts 137, 138, 139, 140, wires 144', 144, normally closed contacts 150 and 151, wire 152 to the negative side of the transfer solenoid 155 which becomes energized as the circuit is completed from the positive side of the solenoid 155 through wires 153, 110, 111, fuse 112 to the electric source 106. The energizing of the solenoid 155 issues a transfer or ticket to the passenger or customer as explained in another part of this specification.

Also, this same negative current flows through contacts 141 and 142, wires 145, normally closed contacts 146 and 147, 146' and 147' and 146" and 147" and wire 148 to the negative side of both the whole fare register signal 160 and whole fare register WOD, and as the positive side of both these are connected through wires 149', 149, 156 and 111, and fuse 112 to the positive side of the electric source 106, these instruments are momentarily energized, registering and signaling the fare or admission.

Due to the mechanical construction of the contacts of the relay TO the contacts 139 and 140, and 141 and 142 are normally closed while the contacts 132 and 133, and 137 and 138, are normally open, but when the coil 130 becomes energized attracting the arm 131 it bears against the pin 131' which closes contacts 132 and 133, and 137 and 138 first, then as the arm continues to bear against and move the pin 131' its two extensions 132' and 133' bear against contacts 140 pin 131' which closes contacts 132 and 133, and 141 respectively. Therefore, when the coil 130 is energized by the dropping of the coin revolving the wheel 113 and closing the contacts 114 and 116 it is kept energized through the closing of contacts 132 and 133, and simultaneously, by the closing of the contacts 137 and 138, the transfer solenoid 155 and the whole fare register WOD and register signal 160 are energized momentarily only, as pins 132' and 133' open the contacts 139 and 140 and 141 and 142 immediately after the closing of contacts 137 and 138. Then after the finger has picked up and dropped with the coin to a forty-five degree position the coin drops into its cylinder and the finger bears against the plunger 146 which opens the contact 135 and 136, thereby breaking the circuit to the relay TO and returning its contacts to their normal positions. Also, if the coin previously dropped was a ten cent token and before the finger had dropped it breaking the circuit to the relay TO, a dime was dropped in its respective slot, it would revolve the wheel 113 and open the contact 114' and 115', as was the case with the token, which would break the circuit to the relay TO and immediately after, when the contacts 115' and 116' were closed the said relay TO would again be momentarily energized registering and signaling the fare or admission and again issue a transfer by the energizing of the transfer solenoid 155.

In order to insure dependable and instantaneous operation of the whole fare or admission register its signal 160, and the transfer issuance, the aforesaid contacts and relay TO is designed as shown, and negative current to the coil 130 of the relay TO must flow through the contacts 114" and 115", 114' and 115', 114 and 115, and 135 and 136, 135' and 136', and 135" and 136" in series before reaching the said coil 130, so that no matter if a coin is dropping while another has just been dropped they will both send their individual negative impulse to the register, its signal, and the transfer solenoid.

The wiring connections and design of the half fare or admission relay THO is identical to that of the whole fare or admission relay TO, also the design and operation of the wheels 113 and contacts 114, 115, 116, 135 and 136 of the half fare token and nickel slots is identical to that of the whole fare dime, token and double nickel slots. The only differences therefore are that the whole fare or admission has three types of coins, namely, the dime, ten cent token, and double nickel, whereas the half fare or admission has only two types of coins, namely, the five cent token and the nickel and the half fare odometer HOD and its signal are operated and registered, instead of the whole fare odometer WOD and its signal 160. Both relays, however, operate the transfer solenoid 155.

As there may be times when the transfer solenoid 155 will not be able to operate and issue transfers as fast as the coins are dropped in the box due to the contacts 150 and 151 opening each time an impulse is sent to the solenoid 155 and it operates moving the transfer out of the box approximately one inch, in other words, the fares can not be dropped at a faster rate than it takes the solenoid to move the transfer out one inch and the passenger pulling it out until it cuts off. Therefore, in order to take care of this emergency a button 302 is located in the box preferably convenient to be manually operated by the passenger so that in the event he requires a transfer and the solenoid 155 has not issued one to him, he may press this button which closes the contacts 304 and 305 and sending a negative impulse to operate the solenoid 155.

*Transfer issuing apparatus*

The casing has a suitable removable plate 400 thereon adapted to rotatably mount at 401, a roll 402 of transfers, tickets or the like. Such tickets or transfers are usually a coiled strip of paper and the same are fed from the roll by feed wheels 403 equipped with peripheral bands 404 of rubber. Said rolls are carried by a shaft 405 on which a gear wheel 406 is keyed. Such gear wheel meshes with a gear wheel 407 rigid with a shaft 408 which carries a switch-actuating disk or wheel 409, and also a pinion 410. This pinion 410 is engaged by a rack bar 411 which has pin and slot connection at 412 with a lever 413 pivoted at 414. Such lever has an armature 415 connected therewith and associated with the magnet 155. Normally a coil spring 416 retracts the rack bar 411. Upon the magnet 155 being energized, the rack 411 is moved to the left in Figure 11, thereby actuating the shaft 408, parts thereon, and through the gearing operating the feeding wheels 403. Due to the rotation of the wheel 409 a lug 417 thereon is engageable with the contact 151 in order to open the same from the contact 150. In addition, a lug 418 is carried by the said wheel 409 and it engages a lug 419 on a cutter 420, which it is adapted to depress so as to cut or sever a ticket 421, which it will be noted from Figure 11 extends partly out of the machine for ready grasping. The cutter 420 is guided in a bracket 422 and the same is normally maintained elevated by a contractile spring 423 secured thereto and to the casing.

In the circuit of the solenoid 155, an emergency button or switch 302 is located so that it may be manually operated at any desired time. The coins, it will be realized, in many instances, drop faster than the machine will operate and in order to expedite the issuance of transfers, tickets or the like, the button 302 may be operated in order to close the ticket issuing circuit.

Retrograde movement of the shaft 408 is prevented by a spring controlled pawl 424 coacting with a ratchet 425 on said shaft.

When the box is to be used as an admission box in a theatre, exhibition, show or the like, the tickets for admission may be printed on a roll as at 402 and perforated, at a length equal to either one quarter or one third the circumference of the wheel 409, at which points similar lugs as at 417 may be screwed into tapped holes in the wheel 409, when the length of the ticket is desired to be one quarter the circumference of the said wheel 409 then additional lugs 417 may be inserted at 430, 429 and 427 and if the length of the tickets are to be one third the circumference of the wheel 409, lugs 417 may be inserted at 426, 428 and 430. These lugs will bear against the spring bronze contact 151 breaking it away from the contact 150, each time the solenoid is energized, by the payment of the admission into the box, and a ticket equal in length to either a quarter or third of the circumference of the wheel 409, as the case may be, will be issued by the box to the customer.

When the box is to be used as a fare box on a street car, bus, etc., and the price of the fare includes a transfer at some junction to another street car, bus, etc., the transfers may be printed on a roll as at 402, each transfer to be approximately 4⅝" long or the length of the outer circumference of the rubber roller 403, under which the roll of transfers pass. When the fare is paid by the passenger into the box, a momentary impulse is sent to the transfer solenoid 155, through the normally closed spring bronze contacts 151 and 150. The energizing of the solenoid 155 attracts its armature 415 to which is connected a clevis rod 413 which in turn is pinned to the rack bar 411 at 412. The aforesaid bar 411 moves to the left (referring to Figure 11) thereby rotating the pinion 410 and the ratchet 425, which are both keyed to the shaft 408, and as the ratchet 425 engages the pawl 424 the wheel 409 and the gear wheel 407 to which it is keyed rotate counterclockwise. As the gear wheel 406 is geared to the gear wheel 407 the aforesaid gear wheel rotates in a clockwise direction along with the rubber roller 403 which is integral with it. This clockwise rotation of the roller 403 forces the transfer out of the box as it rolls between the said roller and the rubber roller 433 which is freely journaled on the shaft 432. The curved lower portion of the guide or bracket 422 tends to keep the transfer flat to keep it from buckling. A lug 417 is so placed on the wheel 409 that when the rack bar 411 has reached the end of its stroke the said lug bears against the contact 151 breaking it away from the contact 150 and thereby opening the circuit to the solenoid 155. As the movement of the rack bar 411 revolves the rubber roller 403 90 degrees, the transfer is forced out of the box approximately an inch to be grasped by the passenger and pulled. This causes the rollers 403 and 433 to rotate until the lug 418 on the wheel 409 bears against the lug 419 on the knife 420, moving the said knife down against the tension of the spring 423 until it cuts through the transfer at 434 after which the lug 418 slides off the lug 419 allowing the spring 423 to return the knife 420 to its normal position as shown in Figure 11.

As can be seen by the previous description the transfer is unaccessible until the fare is paid into the box, the last transfer issued having been cut off at 434 inside the box, after which it slides out one inch to be pulled out by the passenger and automatically cut off. In the event that a passenger having paid his fare does not desire a transfer it remains protruding from the box, and as the lug 417 has opened the contacts 151 and 150 at this point of operation, the circuit to the solenoid 155 is broken, and when the next passenger pays his fare into the box the solenoid 155 will not operate to further move the aforesaid transfer.

It will be noted in Figures 10 and 11 that all parts are in their respective normal positions except the lug 418, which is shown about to engage the lug 419 and thereby move the knife 420 down to the cutting position at 434; although the lug 418 and the tapped holes 430, 429, 428, 427 and 426, and the lug 417 are in their respective normal positions on the wheel 409. This is done to bring out more clearly the mechanism and its operation.

*No coin alarm*

In each coin cylinder 326' to 333' there is located a lever or trigger 101 pivoted as at 101'. Such lever is of L shape and one of its arms under the weight of the other arm is urged normally into the associated cylinder. Hence, when the coins are in place in the cylinders neither arm extends into the cylinder. However, when a predetermined number of coins remain in the cylinders, for instance, two, such lever 101 tilts so that one of its arms extends into the cylinder and the other arm serves to close an alarm circuit. Specifically after the third coin from the bottom of each cylinder has dropped to the second coin position, the associated trigger 101 moves into the cylinder due to counterweighted remainder thereof dropped by gravity and the contact on the counterweighted end engaging the contact 102 which is connected by wire 103 to the negative side of the bell or buzzer alarm 104, and as the trigger itself is grounded and the negative side of the electric source 106 (Figure 1—A) is grounded, and as the wire 107 connects the positive side of the audible signal 104 to the positive side of the electric source 106 through wires 108, 109, 110, and 111, the fuse 112, the circuit is completed and the alarm 104 sounds, warning that the coins in a cylinder are running out.

*Coin release from cylinders*

As previously mentioned each cylinder has a solenoid which operates and moves a plate 356 which is the exact size of the coin in that cylinder, throwing the plate out and coin within it into the passage 380 when the solenoid is energized. The solenoids operate automatically on the quarter and half dollar changing, and operate through the relays 230, 235, and 240 by manual operation of the buttons 231, 236 and 241 respectively, on the half fare changing of halves, quarters and dimes.

In addition each solenoid has its individual button, namely, the buttons 260, 261, 262, 263, 264, 265, 266 and 267, one side of which is connected to the negative side of the source 106, through wires 171', 170', 170, 121 and 120 while the other sides of the button are connected to the negative sides of their respective solenoids. As the positive sides of these solenoids are permanently connected by wires 149, 156, 111 and fuse 112 to the positive side of the source 106, they may be operated individually by a pressure on the button of the solenoid it is desired to operate. A single momentary pressure on a button will operate the solenoid once and drop one coin from that cylinder, but a maintained pressure on the button will continue to operate the solenoid of the button pressed as long as the pressure is maintained and there are coins in the cylinder. This action is due to the armature 260' of the solenoids opening the circuit from the negative source, which is present on the solenoid side of the button when pressed, to the negative side of the solenoid energized by breaking the contacts 261' and 262'. The breaking of these contacts by the armature 260' of a solenoid deenergizes that solenoid returning it and its plate to the normal position where it picks up another coin and simultaneously the contacts 261' and 262' are closed completing the circuit again to that solenoid and again energizing it, and so on as long as a pressure is maintained on the button. These buttons may be located either in the box, on the outside of the box, or near the driver of the vehicle, but preferably inside the box, as their operation is primarily for the purpose of emptying the cylinders of the box of their coins.

*Mechanism for changing half dollars, quarters, and dimes for half fare passengers*

Means is provided for changing half dollars, quarters, and dimes for half fare passengers, and each half fare is registered on the odometer HOD with which is associated an audible signal 161. All change for half fares is discharged into a chute 42 having a closure gate 204 pivoted thereto and similar to the closure 14 and 15. Such coins or change for half fare passengers is discharged directly into the chute 380 but in order to deflect the same into chute for the tube, a gate 10 is provided which is automatically shifted during the issuance of the change, so as to rest against the front wall of the cabinet and thereby prevent the change from reaching the gate 9 but deflecting the same into the chute 42. To effect the change for half dollars, quarters and dimes for the half fare passengers, the relays 230, 235, 240 with their respective armatures 230ª, 235ª, and 240ª and their respective contacts are provided to be energized by the manually controlled buttons 231, 236, and 241, respectively. Such buttons are located at any suitable point or position convenient for operation by the driver of the vehicle or other attendant, depending on the use of the device.

If a half dollar were tendered the driver of a vehicle, street car, bus, or the like, he would accept the same and momentarily press the button 231. This allows negative current to flow from the negative side of the source 106 through wires 120 and 121, contacts 172 and 171, wire 170, normally closed contacts 175 and 177, wire 170', contacts 180 and 179, wire 171' to one side of the button 231 and from the other side of said button, wire 103' to the negative side of the relay 230, and as the positive side of the source 106 is permanently connected to the positive side of this relay, it becomes energized attracting its armature 230ª which operates the various sets of contacts associated therewith. The closing and opening of the various contacts caused by the energizing of the relay 230 are as follows:

The circuit to the whole fare register WOD is broken by the opening of contacts 147" and 146" as these contacts are in series with contacts 147' and 146' of the relay 235, and contacts 147 and 146 of the relay 240, from the wire 145 and contact 196 of the gate relay 201.

The circuit to the one dollar pilot light 250 is broken by the opening of contacts 206" and 207", as these contacts are in series with the contacts 207' and 206' of the relay 235, and contacts 207 and 206 of the relay 240, from the wire 174' and the negative side of relay 202.

The circuit to the half dollar solenoid H is broken by the opening of contacts 314" and 315", as these contacts are in series with the contacts 314' and 315' of the relay 235, and contacts 314 and 315 of the relay 240, from the wire 326" and contact 191 of the gate relay 201.

The closing of the contacts 302", 303", 304" and 306" sends out a negative impulse from the source 106 through wires 120 and 121, contacts 172 and 171, wire 172' to contact 302", thence through contact 303" to the negative side of the half fare register HOD and its signal 161, through contact 304" and wire 103' to the negative side of the relay 230 and the half dollar pilot light 251 maintaining them in energization until the contacts 172 and 171 are broken, and through contact 306" to the negative side of the gate relay 201.

Also the contacts 307" and 308" are closed, which closes the circuit from the negative side of the half fare nickel solenoid HN through the wire 309, the said contacts 307" and 308", and the wire 309' to the open contact 309" of the gate relay 201.

The gate relay 201 then becomes energized by the negative impulse from contact 306" of the relay 230, throwing the gate 10 across the passage and simultaneously opening and closing the various contacts associated with the relay 201. The opening and closing of these contacts accomplishes the following:

A negative impulse is sent from the contact 180', through wire 180" and contact 187, through contact 188, and wires 323' and 46 to the negative side of the nickel solenoid N; through contact 309", and wire 309', through the contacts 308" and 307", which were closed by the energizing of relay 230, and wire 309 to the negative side of the half fare nickel solenoid HN; through contact 189, wire 47", through the closed contacts 47 and 48 of the relay 240 and wire 47' to the negative side of the dime solenoid D; through contact 190, wire 325", through the closed contacts 311 and 310 of the relay 240, and the closed contacts 311' and 310' of the relay 235, and wire 325' to the negative side of the quarter solenoid Q; and through contact 191, wire 326", the closed contacts 315 and 314 of the relay 240, and the closed contacts 315' and 314' of the relay 235, to the contact 315" of the relay 230, but as the contact 315" is open from the contact 314", which leads the negative side of the half dollar solenoid H, due to the relay 230 being energized, no negative current flows to the solenoid H. This set of contacts of the relay 201 therefore operates the nickel, half fare nickel, dime and quarter solenoids dropping 45 cents change into the passage and through the gate 203 into the receptacle 42.

The closing of contacts 184, 185 and 186 of the relay 201 sends out a negative impulse, and the closing of contacts 181, 182 and 183 sends out a positive impulse to the two lock relays 1 and 2 which energizes them and prevents any quarters and halves from changing during the changing of the half dollar for the half fare passenger.

The energizing of relay 201 also causes the contacts 179 and 180 to open, breaking the circuit to the buttons 231, 236, 241, and 200 which prevents their operation again until the change of the half dollar is removed from the receptacle 42, and closes the contacts 180 and 180' which supplies negative current to maintain the gate relay 201 in energization, and through wire 180", contacts 192, 193, 197, and 198, and wire 144', to the negative side of the transfer solenoid 155, which issues a transfer to the passenger.

After the forty-five cents change has dropped past the gate 203 it closes the contacts 174 and 173, which supplies negative current from wire 121, through wires 173' and 174' to the negative side of the relay 202. As the positive side of this relay is permanently connected to the positive side of the source 106 it becomes energized closing the contacts 177 and 175', which causes the negative current from wire 121 to flow through the closed contacts 172 and 171, wire 170, contacts 177 and 175', and wire 174' to the negative side of the relay 202 to maintain it in energization, also the contact 177 opens from the contact 175, which breaks the negative current to the gate relay 201 and the buttons 231, 236, 241 and 200.

Simultaneously the contacts 176 and 177' are opened breaking the positive flow of current through wire 201" to the positive side of the gate relay 201, which deenergizes, causing all its contacts to return to their normal position, and the gate 10 to return to its normal position of closing the passage 211 and opening the passage to the receptacles 40 and 41.

As the deenergization of the gate relay 201 opens the contacts 184, 185 and 186, and 181, 182 and 183, the lock relays 1, 2 become deenergized too, and the changing of the whole fare quarters and half dollars may continue.

The relays 202 and 230 stay energized and the half dollar pilot light 251 stays lit, therefore, until the 45 cents change is removed from the receptacle 42 by opening the door 204, which opens the contacts 171 and 172 breaking the circuit from the negative side of the source 106, through wire 170, and contacts 177 and 175' to the relay 202; and through wire 172', and contacts 302", 303" and 304", and wire 103' to the relay 230 and pilot light 251.

If the half fare passenger gives a quarter to the vehicle driver for change he presses the button 236, which operates the relay 235, and if a dime is tendered he presses the button 241 which operates the relay 240. These two relays function exactly like the relay 230 except that the first drops only twenty cents change (a dime, and a nickel from each of the solenoids N and HN) and lights the pilot light 252 indicating change for a quarter in the receptacle 42, and the second drops only five cents change (from the solenoid N) and lights the pilot light 253 indicating change for a dime in the receptacle 42.

It will be noted in the operation of these relays 230, 235 and 240 that after one is operated and the change is laying in the receptacle 42 the other relays can not be operated by pressure on their buttons, or the whole fare dollar change can not be operated by its button 200 or the box can not be emptied of its coins by pressure of the coin release buttons 260, 261, 262, 263, 264, 265, 266 and 267.

Also it will be noted that when one of these relays is in operation the automatic changing of whole fare quarters and halves is locked out of operation until the half fare change has dropped past the gate 10 and the gate 203, after which the gates 10 and 203 close and the function of the rest of the box may continue. Therefore, the operation of these relays 230, 235 and 240 and the whole fare dollar changing operation can be accomplished just as fast as the change is taken, each time, out of the receptacle 42.

Automatic no-current locks

This feature of the fare box has been added thereto so that when the current from the source ceases to be available, due to a blown fuse, no line voltage, a broken wire or connection, etc., the operation of the fare box will be automatically locked, instantaneously preventing any coins from dropping into the box without registering or giving change, and in other ways tending to insure fool-proof operation thereof.

Referring specifically to Figures 13 and 9 a shaft 361' is carried horizontally across the box being supported at each end by the side plates of the said box and having rock cams 365' keyed thereon and placed directly behind each U-shaped detent 365. Also a shaft 362' is likewise carried horizontally across the box and having lock catches 388 keyed thereon and placed directly behind the back end of each finger 335. In two places as shown on Figure 9 the said mentioned shaft 361' and 362' are linked together by the rod-clevises 394 keyed on the shaft 361' and rod-clevises 396 keyed on the shaft 362' and the links 395.

A rod-clevis 392 is keyed to the shaft 361' and pinned at 397 to the armature 391 of the electric solenoid 390. On the upper end of the said armature is attached a substantially heavy coil spring 393 which is attached to the lug 398 on the upper wall of the box.

The tension of the said spring 393 normally tends to lift the armature 391 and its associated rod-clevis 392, which action rotates the shaft 361' counterclockwise (facing Figure 13) and causing the rock cams 365' to bear to the left against the U-shaped detents 365 associated with each coin cylinder. As previously explained in this description these detents 365 when rotated on their common shaft 361, counterclockwise, lock the coin wheels 113 preventing rotation thereof, which of course keeps any coins from dropping into any of the cylinders.

As the shafts 361' and 362' are linked together by the rod-clevises 394 and 396 and the link 395, the shaft 362' also rotates simultaneously with the shaft 361' in like direction and causing the lock catches 388 to move to the left preventing the raising of the back end of the fingers 335 if they are in their normal positions.

When the fare box is not in use and the current is switched off the box is locked, preventing any coins from entering it past the wheels 113. When the current from the source or supply is turned on, the solenoid 390 being connected directly across the source 106 (Figure 1—B) becomes energized attracting its armature 391 against the tension of the spring 393 and unlocking the detents and fingers. Therefore, as long as the current is available and keeps the solenoid 390 energized the box is unlocked for operation, but if at any time the current fails, the box will instantaneously and automatically become locked against further use until the current is again available.

Various changes may be resorted to provided they fall within the spirit and scope of the invention.

What is claimed is:—

1. A machine of the class described having automatic means to successively discharge change for full fare passengers operable upon the simultaneous or successive deposit of each of a plurality of predetermined coins of various denominations, means operable by momentary-contact remote control to automatically discharge change for half fare passengers, a chute to receive all of said change, means whereby change for full fare passengers is successively delivered to a plurality of receptacles, and means whereby change for half fare passengers is delivered to a location independent of the said receptacles.

2. In a machine as described in claim 1 having coin deposit chutes, and fingers extending into the same displaceable by coins of predetermined weight, said fingers transferring the said coins to associated coin cylinders directly connected therebeneath, electrically operated individual coin ejectors for each cylinder, and means including the said fingers, and relays with their associated contacts whereby simultaneous operation of one or more of the said ejectors will discharge change in proportion to the value of the coin deposited.

3. A device of the class described having a plurality of coin deposit chutes and fingers extending into the same displaceable by coins of predetermined weight, said fingers transferring the said coins to associated coin retaining cylinders directly therebeneath, the said fingers retaining coins too light in weight, and means to eject the last mentioned coins from the chutes into an external accessible receptacle by remote control, comprising ejector plates for each chute fixed to and movable by a common traverse rock shaft actuated by an electric solenoid.

4. A machine of the class described having automatic means to successively discharge change for full fare passengers operable upon the simultaneous or successive deposit of each of a plurality of predetermined coins of various denominations, means operable by electrical, momentary-contact, remote control to automatically discharge change for half fare passengers, a chute to receive all of said change, means whereby change for full fare passengers is successively delivered to a plurality of receptacles, means whereby change for half fare passengers is delivered to a location independent of the said receptacles, and means operable automatically to delay automatic operation of the machine in respect to full fare coin actuation while the machine is delivering half fare change.

5. A machine of the class described having means to discharge change automatically for full and half fare passengers, a means, coacting with the first mentioned means, to automatically operate by electric power a register, for each full fare deposited or coin for full fare given change for, and a means, coacting with the first mentioned means, to automatically operate by electric power a register, for each half fare deposited or coin for half fare given change for.

6. A machine of the class described having coin deposit chutes, coin cylinders directly connected therebeneath, electrically operated individual coin ejectors for each cylinder, means, consisting of electrically operated relays and their associated contacts, operable automatically to successively discharge change upon the simultaneous or successive deposit of each of a plurality of predetermined coins of various denominations, in combination with an electrically operated strip feeding mechanism to issue transfers or tickets for each fare deposited.

7. A machine of the class described having coin deposit chutes, coin cylinders directly connected therebeneath, electrically operated individual coin ejectors for each cylinder, means, consisting of electrically operated relays and their associated contacts, operable automatically to successively discharge change upon the simultaneous or successive deposit of each of a plurality of predetermined coins of various denominations, and means operable automatically to successively deliver the said change to different receptacles, in combination with an electrically operated strip feeding mechanism to issue transfers or tickets for each fare deposited.

8. A machine of the class described having coin deposit chutes, coin cylinders directly connected therebeneath, electrically operated individual coin ejectors for each cylinder, automatic means to actuate the said coin ejectors to successively discharge change for full fare passengers, operable upon the simultaneous or successive deposit of each of a plurality of predetermined coins of various denominations, means operable by electrical, momentary-contact, remote control, to automatically actuate the said coin ejectors to successively discharge change for half fare passengers, a chute to receive all of the said change, means whereby change for full fare passengers is successively delivered to a plurality of receptacles, and means whereby change for half fare passengers is delivered to a location independent of the said receptacles, in combination with an electrically operated strip feeding mechanism to issue transfers or tickets for each fare deposited, or coin for fare given change for.

9. In a machine as described in claim 8, having coin deposit chutes, an electrically operated solenoid normally energized and opposing means, comprising a plurality of traverse rock shafts and locks fixed to and rotatable therewith, operable normally to prevent passage of coins deposited in the said chutes.

10. In a machine as described in claim 8, having coin deposit chutes, and means, comprising a contractile spring, connected to a plurality of traverse rock shafts and locks fixed to and rotatable therewith, and operable normally to actuate the said locks to prevent passage of deposited coins in the said chutes, and an electrically operated solenoid normally energized, and operatively connected to and opposing the said means.

11. In a machine as described in claim 8, having coin deposit chutes, and means, comprising a contractile spring, connected to a plurality of traverse rock shafts and locks fixed to and rotatable therewith, operable normally to actuate the said locks to prevent passage of deposited coins in the said chutes, and an electrically operated solenoid operatively connected to and opposing the said means when energized, but when deenergized, due to failure of current to the machine, allowing the said means to actuate the locks to prevent passage of deposited coins in the said chutes.

12. A machine of the class described having automatic means to successively discharge change for each of a plurality of predetermined coins of various denominations simultaneously or successively deposited, operable by coin fingers, displaceable by coins of predetermined weight, which fingers drop and transfer the said coins to coin cylinders directly beneath the said fingers, automatic electrically operated means to hold the said fingers in their lowered positions until change for the said coins has been discharged, means consisting of contacts associated with the second mentioned means operable by coin gates, said contact means operable to cause the second mentioned means to release the said fingers allowing them to return to normal position, and means, operable automatically upon return of the said fingers to normal position, to release a subsequently deposited coin for operation of the machine.

13. A machine of the class described having automatic means to successively discharge change for each of a plurality of predetermined coins of like denomination simultaneously or successively deposited, said means consisting of electrically operated relays with their associated contacts, and an electrically operated swinging gate with associated contacts, said gate operable by the second mentioned contacts coacting with the first mentioned contacts, to successively deliver the change of each of the said coins alternately to a plurality of receptacles.

14. A machine of the class described having automatic means to successively discharge change for each of a plurality of predetermined coins of various denominations simultaneously or successively deposited, said means consisting of electrically operated relays with their associated contacts, and an electrically operated swinging gate with its associated contacts, said gate operable by the second mentioned contacts coacting with the first mentioned contacts, to successively deliver the change of each of the said coins alternately to a plurality of receptacles.

15. A machine of the class described having automatic means to successively discharge change for each of a plurality of predetermined coins of various denominations simultaneously or successively deposited, said means consisting of electrically operated relays with their associated contacts, and an electrically operated swinging gate with its associated contacts, said means operable automatically to alternately change one coin of a denomination at a time, and said gate operable by the second mentioned contacts coacting with the first mentioned contacts, to successively deliver the change of each of the said coins alternately to a plurality of receptacles.

16. In a machine as described in claim 15, having means to automatically prevent change of a coin of any denomination to be delivered to any receptacle, if the said receptacle has not been emptied of its previously delivered change.

17. In a machine as described in claim 15, having electric pilot light means operable automatically to indicate the amount and location of change delivered.

18. In a machine as described in claim 4, having a plurality of receptacles delivering change for full fare passengers and a receptacle independent of the first mentioned receptacles delivering change for half fare passengers, also having electric pilot light means operable automatically to indicate the amount and location of change delivered.

EDWIN F. WHEELER.